(12) United States Patent
Rosenfeld

(10) Patent No.: US 8,878,888 B2
(45) Date of Patent: Nov. 4, 2014

(54) HOSPITAL TV/MONITOR DISPLAY CONTROL WITH HIERARCHICAL ACCESS CONTROL

(75) Inventor: Brian Rosenfeld, Baltimore, MD (US)

(73) Assignee: Koninklijke Philips N.V., Eindhoven (NL)

( * ) Notice: Subject to any disclaimer, the term of this patent is extended or adjusted under 35 U.S.C. 154(b) by 667 days.

(21) Appl. No.: 13/127,303

(22) PCT Filed: Oct. 28, 2009

(86) PCT No.: PCT/IB2009/054789
§ 371 (c)(1),
(2), (4) Date: May 3, 2011

(87) PCT Pub. No.: WO2010/052613
PCT Pub. Date: May 14, 2010

(65) Prior Publication Data
US 2011/0214153 A1 Sep. 1, 2011

Related U.S. Application Data

(60) Provisional application No. 61/112,308, filed on Nov. 7, 2008.

(51) Int. Cl.
| | |
|---|---|
| H04N 7/14 | (2006.01) |
| H04N 7/173 | (2011.01) |
| H04N 7/15 | (2006.01) |
| H04N 21/443 | (2011.01) |
| H04N 21/4223 | (2011.01) |
| H04N 21/239 | (2011.01) |
| H04N 21/4788 | (2011.01) |
| H04N 21/258 | (2011.01) |

(52) U.S. Cl.
CPC ............ *H04N 7/15* (2013.01); *H04N 7/17318* (2013.01); *H04N 21/4438* (2013.01); *H04N 21/4223* (2013.01); *H04N 21/2396* (2013.01); *H04N 21/4788* (2013.01); *H04N 21/25816* (2013.01)

USPC ........................................ 348/14.01; 709/204

(58) Field of Classification Search
CPC ............................... A61B 5/0002; H04N 7/15
See application file for complete search history.

(56) References Cited

U.S. PATENT DOCUMENTS

| | | | |
|---|---|---|---|
| 5,441,047 A | 8/1995 | David et al. | |
| 5,758,079 A * | 5/1998 | Ludwig et al. | ................ 709/204 |

(Continued)

FOREIGN PATENT DOCUMENTS

| | | |
|---|---|---|
| DE | 10236470 A1 | 12/2003 |
| EP | 1983457 A1 | 10/2008 |

(Continued)

OTHER PUBLICATIONS

Lymberopoulos, D. C., et al.; ELPIDA: a general architecture for medical imaging systems supporting telemedicine applications; 1995; J. Electronic Imaing; 4(1)84-97.

(Continued)

*Primary Examiner* — Maria El-Zoobi

(57) ABSTRACT

An interactive communication system (400) includes a plurality of in-room video communications system (1250) each including an audio microphone (460), a video camera (440), an audio speaker (470), a patient operated control (420) and a television/video monitor (430). The message sender, e.g. a medical professional, enters a request to contact a selected patient at a terminal (190). A hierarchical access control (130, 135) arbitrates among persons trying to reach a patient based on an accesses hierarchy (200). The requester with the highest role in the hierarchy establishes a video communication link with the patient and appears on the television monitor (430) in place of previously viewed video entertainment.

19 Claims, 12 Drawing Sheets

(56) References Cited

U.S. PATENT DOCUMENTS

| | | |
|---|---|---|
| 6,804,656 B1 | 10/2004 | Rosenfeld et al. |
| 7,256,708 B2 | 8/2007 | Rosenfeld et al. |
| 2001/0046366 A1* | 11/2001 | Susskind .................. 386/46 |
| 2002/0186243 A1 | 12/2002 | Ellis et al. |
| 2003/0052787 A1* | 3/2003 | Zerhusen et al. .......... 340/573.1 |
| 2003/0058838 A1* | 3/2003 | Wengrovitz ................ 370/352 |
| 2008/0194918 A1* | 8/2008 | Kulik et al. ................ 600/300 |

FOREIGN PATENT DOCUMENTS

| | | |
|---|---|---|
| GB | 2446516 A | 8/2008 |
| JP | 2001339648 A | 12/2001 |
| JP | U3097401 U | 8/2003 |
| JP | 2006333165 A | 12/2006 |
| WO | 2007073420 A1 | 6/2007 |
| WO | 2008093268 A1 | 8/2008 |

OTHER PUBLICATIONS

Zou, X., et al.; Dependability and Security in Medical Information System; 2007; Human-Computer Interaction. HCI Applications & Services; Springer; pp. 549-558.

* cited by examiner

US 8,878,888 B2

HOSPITAL TV/MONITOR DISPLAY CONTROL WITH HIERARCHICAL ACCESS CONTROL

CROSS REFERENCE TO RELATED APPLICATIONS

This application claims the benefit of U.S. provisional application Ser. No. 61/112,308 filed Nov. 7, 2008, which is incorporated herein by reference.

The present application relates to the telemedicine and medical communication arts. It may also find application with other forms of remote patient care and with patient communications.

The present application presents a system and apparatus for providing hospital patient monitoring and communication without substantially increasing footprint and power requirements by utilizing already present TV and/or computer monitor screens. This display surface can be used to support multiple concomitant features such as ICU observations and interventions, specialist consults, admissions and 'video visits' by loved ones from afar.

In the past, a communications network has been suggested which provides continuous patient monitoring in order to provide critical care services from a remote location. A plurality of patient monitoring stations with associated patient monitoring instrumentation is connected over a communications network to a central command center to which data flows continuously for analysis. The patient monitoring can also include a video camera through which the appearance of a patient can be monitored, and an audio pick-up is provided through which sounds, e.g., speaking, coughing or wheezing, from the patient or bedside care-giver can be monitored at the monitoring stations.

The present application proposes to expand such a system to provide two-way communications between the patient, the monitoring stations, and others beyond the central monitoring station, including physicians, nurses, or family. The present application also describes a hierarchy system which provides a hierarchy control for accessing the patient/patient room.

In accordance with one aspect, an interactive communication system is provided. It includes a plurality of in-room video communication systems, each of which includes a video monitor, a video camera, a microphone, and an audio speaker associated with a patient. A video selection unit supplies video entertainment and video communications to each of the in-room systems. A hierarchical access control unit arbitrates among entertainment and video communications based on a defined access hierarchy.

In accordance with another aspect, an interactive communication method is provided for in-room audio and video communications. Data related to a patient is entered when a patient is admitted to the hospital. A permission hierarchy including at least one of a system administrator role, a primary care physician role, a specialist consulting physician and a patient role is established. The permissions hierarchy is consulted via a hierarchy access control unit to arbitrate among persons requesting video communication access to the patient and video entertainment. An audio/video communication link is established from a requesting person to an in-room video communication system including a camera, microphone, television monitor, a patient-operated control, and an audio speaker.

An advantage resides in enabling medical professionals treating a patient in a remote or rural location to diagnose and treat a patient by consulting with other medical professionals and specialists in larger hospitals, clinics, and research centers.

A further advantage resides in enabling medical professionals, friends, relatives, and associates to interact remotely with a patient in a hospital by means of a video communication system.

A further advantage resides in enabling the physician or patient to prioritize or restrict the video access, e.g., screen out persons that may cause undue stress to the recuperating patient.

A further advantage enables a doctor to make 'virtual rounds' and visit with more patients than possible if the doctor were to walk the rounds.

A still further advantage resides in permitting split screen functionality which allows the doctor to speak with the patient and friends or relatives simultaneously.

A further advantage resides in enabling the doctor to speak with the patient while simultaneously incorporating readouts, diagnostic images, or any other type of graphical displays to explain medical concepts or treatments to the patient or relatives.

Still further advantages and benefits will become apparent to those of ordinary skill in the art upon reading and understanding the following detailed description.

The present application may take form in various components and arrangements of components, and in various steps and arrangements of steps. The drawings are only for purposes of illustrating the preferred embodiments and are not to be construed as limiting the present application.

Figure 1:
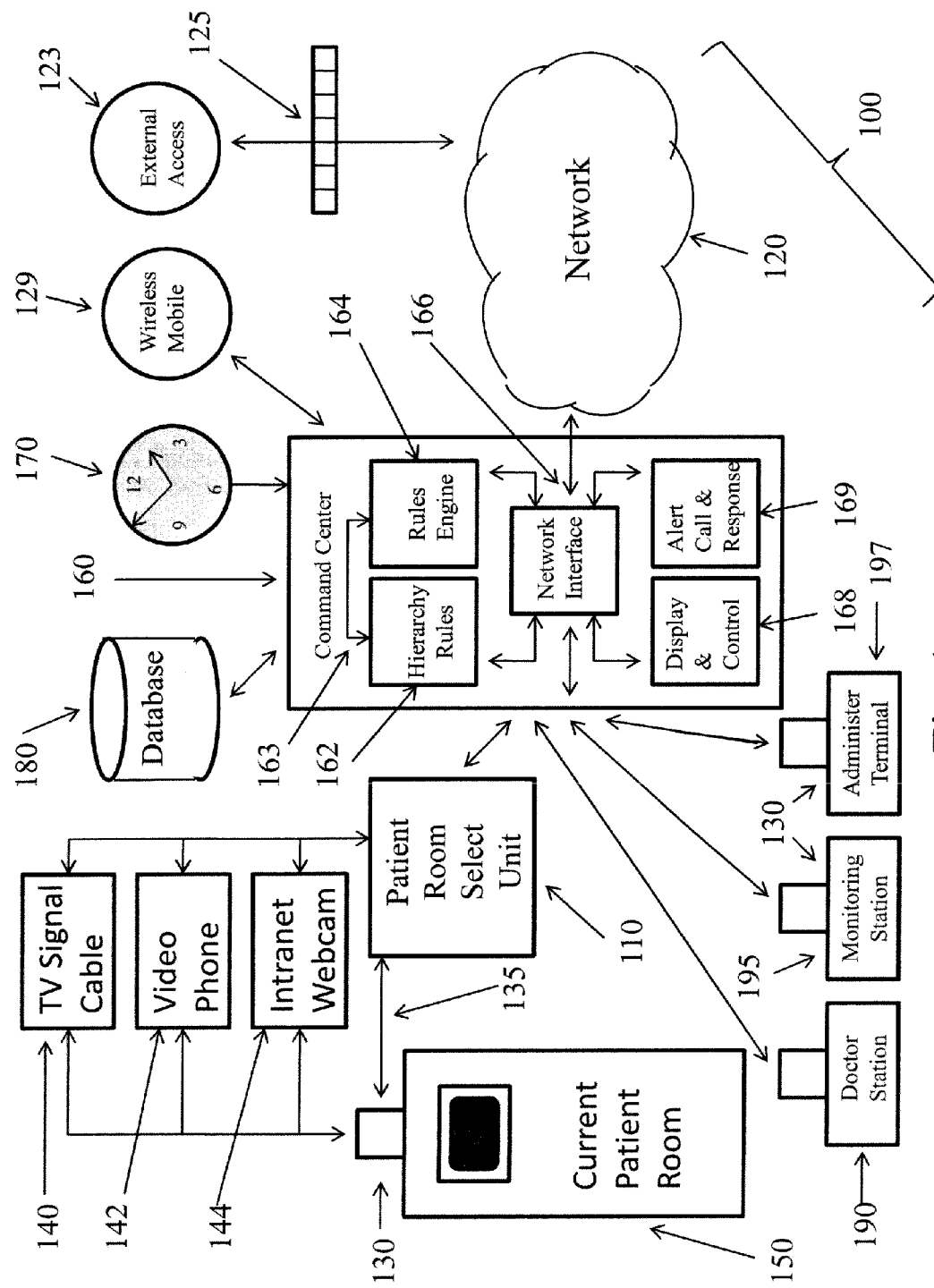
FIG. 1 illustrates the layout of the apparatus components of the system.

With reference to FIG. 1, one example of an embodiment of a proposed system 100 is presented. The patient in a medical facility has a patient room select unit 110 which enables the patient to select a desired communication means to receive communications using at least one of a TV signal cable 140, a video telephone 142, and an Internet webcam 144 from within a room 150 occupied by the patient. The patient control system is networked using a network interface 130 and connected by wire or wireless means 135 to the control unit 110, which determines which signals 140, 142, 144 the patient wishes to enter the patient's room via a network 120.

At the center of the proposed system is a command center unit 160 which facilitates the command and control of the system by managing the exchange of information and signals between the hardware components of the system, the patient, and the networked parties within the system. This unit 160 contains the hierarchy rules 162 established by the higher level users in the system. The unit 160 also contains a hierarchy rules engine 164 which converts the hierarchy entered by the user into a corresponding set of rules 163 that are sent and stored in the hierarchy rules 162 system to interpret and control the system access based on the hierarchy entered by the user. The unit 160 also contains a display and control 168 function, which allows in-room cameras to be controlled remotely such that the remote party may pivot the camera in both vertical and horizontal dimensions. The remote camera may also control the camera zoom lens such that the lens may be moved from a wide angle zoom out overall view to an up close zoom in detailed view in order to obtain a more detailed view. The remote camera control may also adjust the contrast, brightness and focus of the camera remotely. This function may also adjust the volume of in-room microphones or mute a microphone feed to restrict the system to one way communication. Such a function may also block a video signal and restrict the signal to audio only. This function may also control the import of graphical images such as charts and x-rays in lieu of a video feed. This function may also enable a pointer to be used on the graphical image or on the patient video picture, and may facilitate changing of the color of one or more portions of a graphical or picture image in order to highlight a specific portion of a displayed image. Finally, the unit 160 contains an alert call and response 169 function which enables the patient user to call a medical professional in case of an emergency. Each portion 162, 164, 168, 169 of the command central unit 160 is routed through a network interface 166 which is connected to a network 120 such as from an intranet, a local access network (LAN) or a wide area network (WAN).

The system also has remote computer terminals 190 such that the medical professionals can access the system and speak with the patient remotely, e.g., from their home/office. This facilitates a remote video assessment of the patient by a remote physician authorized to perform a remote video diagnosis, performing video rounds, doctor-patient consultations, and many other types of interactions between the patient and medical professionals or others. A monitoring communication station 195 allows an on-duty doctor, nurse, or other medical professionals to monitor patients. Such a terminal may also provide access to any one of a number of specialists, therapists, admissions, or pharmacists. The station 195 may be a nurses station, a medical help desk, a monitoring station for an electric intensive care unit (ICU), or the like. The remote intensive care unit (eICU center) monitors patient vital signs, and distributes these vital sign signals on a network such as the Internet. The system may be comprised of multiple patient room based remote centers with each controlled separately by an individual server within the patient's room. This would serve to provide the patient in the room with more power to control access to the system for the patient and for others. A similar terminal 197 may also be used by a super user to perform system administration duties such as receiving, adding, modifying and deleting information and aspects of the hierarchy.

The central video selection unit also integrates the television signals 140, the video telephone signals 142, and the intranet web camera 144 signals and provides a selected feed via the network 120 to the patient's room 150, and the rooms of other patients under the control of the hierarchy 162. A hierarchical access control centralized in the central unit 160 in the illustrated embodiment could be distributed between the central unit 160 and the individual network interfaces 130. The system also incorporates a time generation means such as a clock 170 to time stamp communications in any record made of a communication, such as in a system log. The clock 170 also synchronizes the components of the system, provides reference clocking for time-dependent hierarchy rules, access to the TV, video phone, or internet, and the like. The system 100 also contains a database 180 to store data entered into the system such as patient records, or data generated by the system, such as the system log or a list of activities and procedures that the patient has underground while in the medical facility.

Encryption or other security is used to secure communications that include medical information. Optionally, high security levels are provided for medical personnel who are using external access 123 through a firewall 125 to communicate over the Internet or other public network and less stringent security levels for communications within the hospital network. The system may also facilitate a wireless mobile functionality 129 located inside of or outside of the firewall 125, such that a patient being moved during the course of treatment may communicate without a wired connection, such as when the patient wishes to communicate while being transported in an audio video equipped ambulance. Such wireless functionality could facilitate uninterrupted communication during a journey to and from a medical facility. External telephone, video phone, internet, and other fields also pass through the firewall.

Figure 2:
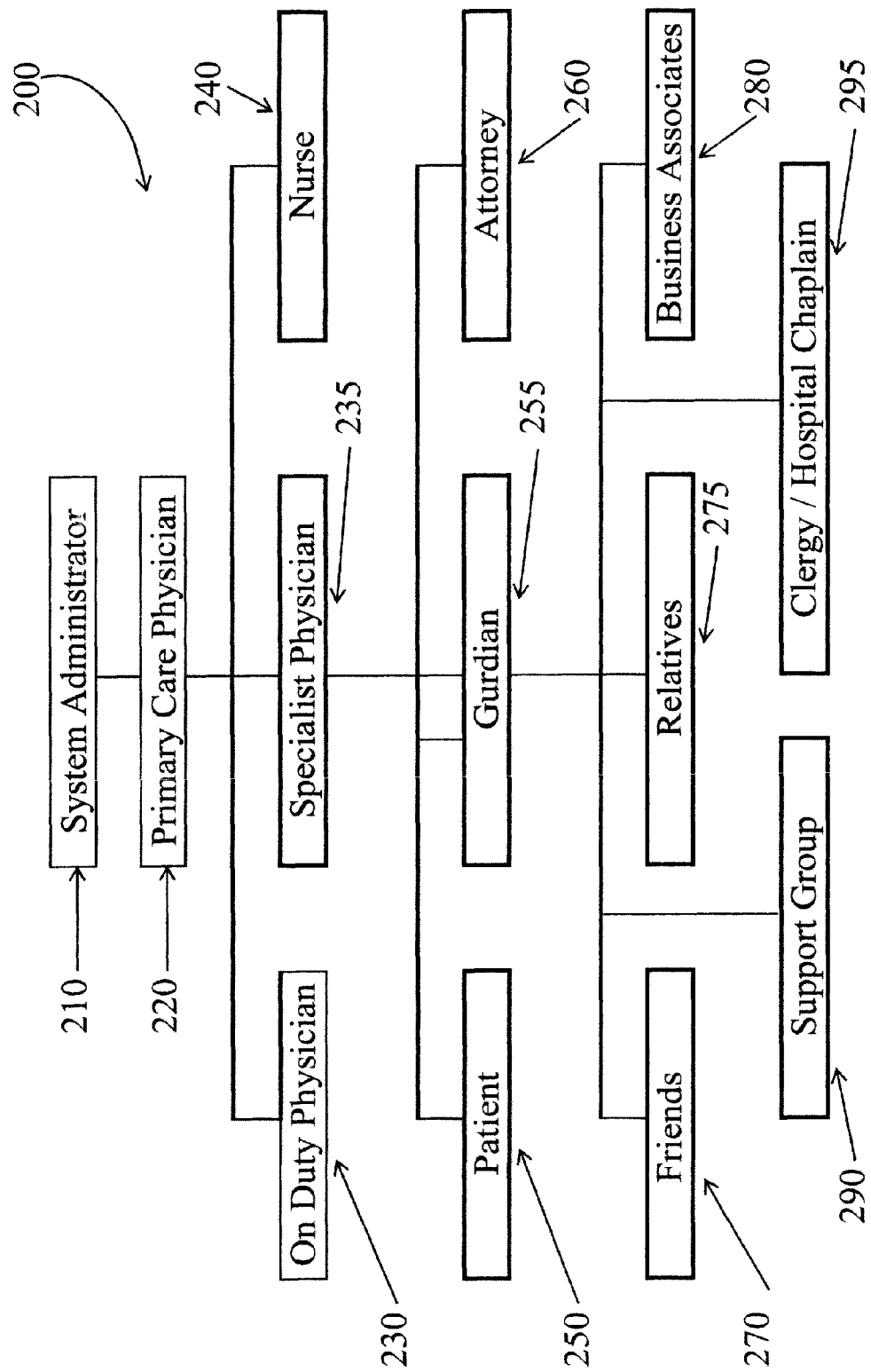
FIG. 2 illustrates one of many possible authority hierarchies for granting permissions in accessing the patient via video means.

With reference to FIG. 2, a permission hierarchy granting and permission revoking authority for a sender to contact a receiver is presented. A hierarchical access control 200 contains different audio and video access levels. Such levels, commonly defined in the art of network administration as "roles", enable a person in each of the individual roles to grant or revoke permissions based on their specific level or role within the hierarchy. Persons occupying roles higher in the hierarchy may over rule permissions granted or revoked by persons in a role at a lower levels within the hierarchy. For example, a specialist consult may take precedence over a video visit from a loved one, watching TV, a video nurse visit, or the like. An urgent intervention from the ICU may take precedence over a specialist consult. Specific access control includes an easy to use access rights management subsystem to grant or deny access to family members, friends for each patient individually.

The system, as administered by a hospital, empowers a system administrator role 210 with the ability to grant, modify, or revoke the visitation rights or ability of anyone within the hierarchy to interact through the system with any patient.

A managing physician role, also called a primary care physician role 220, is accorded to the doctor who is either a primary care physician or is the person in charge of the patient for the duration of the patient's hospital stay, assigns permissions to control the specific people who are granted access to the patient within the confines of the present system. The managing physician role 220 can grant, modify, or revoke the permissions initiated by the system administrator. The managing physician 220 can also control access to the system by those below him in the hierarchy.

An on-duty physician role 230 is accorded to the doctor on duty and in charge of the patient when the managing physician 220 is not on duty. There may be multiple on-duty physicians.

A specialist physician role 235 is accorded to a doctor that has a particular expertise of which the patient is in need. Such duties include, but are not limited to, radiology, cardiovascular, psychiatrist, psychologist, pharmacist, internal medicine, and the like.

A nurse role 240 may be accorded to all nurses within the hospital or may be limited to the nurse who is on duty and in charge of the patient. There can be a hierarchy within the nurses' category.

A patient role 250 enables the patient to assign, modify, and revoke the names of people whom are allowed to visit through use of the system. The patient can also change physicians. In one embodiment of the system, the patient can also ask that the system administrator to revoke permission to a physician and add permission for a new physician. The patient can also set a hierarchy of friends, relatives, business associates, including blocking individuals or groups altogether. For example, the patient can block calls from a specified geographic region.

A guardian role 255 has similar powers to the patient and can assign, modify, or revoke video visitation permission to a collection of friends, relatives or other associated persons. The guardian 255 may likewise have the ability to ask that the system administrator to change doctors.

An attorney role 260, analogous to the guardian role, can assign, modify, or revoke video visitation permissions to a collection of friends, relatives or other associated persons in order to protect a patient that may not be in a healthy enough position to determine for themselves what persons should be allowed to visit. The attorney may likewise have the ability to ask that the system administrator to change doctors for the benefit of the patient.

A friends role 270 accords a priority level(s) to persons who may be in a position to visit the patient electronically through use of the System but do not themselves have the ability to grant, modify, or revoke permissions to any other personage within the system hierarchy. Such a person may appeal to any one entity in a higher level of the system hierarchy to be granted access or a high position in as the hierarchy, including a position where the person would then have grant, modify, and revoke abilities. There can be a hierarchy among friends or different types of friends such as close friends, distant friends, neighbors, co-workers, or lodge brothers.

A relative role 275 accords a priority level(s) to persons who may be related by birth or marriage to the patient and may be in a position to visit the patient through use of the system, but do not themselves have the ability to grant, modify, or revoke permissions to any other personage within the system hierarchy. Such a person may appeal to any one entity in a higher level of the system hierarchy to be granted a higher position including a position where the friend would then have grant, modify, revoke abilities. For example, there can be a hierarchy among relatives such as father, brother, and the like.

A business associate's role 280 is accorded to persons who may have a meaningful business relationship with the patient and may have a need to visit the patient through use of the system regarding conduct of business or financial affairs. Business associates 280 do not themselves have the ability to grant, modify, or revoke permissions to any other personage within the system hierarchy. Such a person may appeal to any one entity in a higher level of the system hierarchy to be granted a position where the business would then have grant, modify, revoke abilities.

A support group role 290 is accorded to other patients, in hospital or at home, with the same malady or affliction to facilitate visitation and communication among groups of patients. Such a group could grant permissions to participate in group discussions or activities.

Counseling support could also be provided by a clergy role 295 may be accorded to the patient's clergyman, a hospital chaplain, or other spiritual counselors. As such, these counselors could grant permission to patients such that the patients could speak with these counselors remotely.

The presented hierarchy is but one of a possible implementation of a hierarchy. Other hierarchies are envisioned where the order of the participants are in a plurality of different orders. In one embodiment, the hierarchy is dynamic in that it changes automatically in response to time of day, medical condition, outputs of a physiological parameter monitor, the physical presence of a medical professional with the patient, and the like. For example, after 9:00 pm access may be cut off to all but medical personnel or personnel and a spouse. This can be based on the visiting hours of the hospital. As another example, if the patient's monitored vital signs exceed a threshold, access can be similarly limited to medical professions. As another example, the patient's vital signs can control the type of entertainment programming that the patient can watch. A friend, relative, or business associate that causes the monitored vital signs to cross a threshold may have their access curtailed or cut off. Furthermore, the assignment of permissions may be automated such that a human user is not needed to perform the assign, modify, and revoke tasks. Such automation may be based on a patient symptom access control and the ability for patient's vital signs or symptoms to engage remote physicians/nurses and then enable select access back into the patient's room. An automated access list management based on an existing electronic care management (or ICIP) system can automatically populate the roles of admitting and managing physicians to a patient's individual access list, and automated updates based on patient status.

The assignment of access, modification, or revocation of permissions may be performed via management functions from a central hospital communications network, the remote clinical operations site ICU or hospital, the local nurse's station, or all of the above.

The hierarchy information may be entered into the system through use of a graphical user interface that may provide drag and drop, point and click, or text based functionality in order to enable the user to entered a suggested hierarchy for storage in the command center 160. The rules engine 164 is a software program that takes this graphical user input converts it into a set of rules which are stored in and enforced by the hierarchical rules 162 module of the command center 160. The rules engine selects elements from the user interface that were entered by the user and compares them to same or similar elements within the collective memory of the system's database 180. From this comparison a set of rules is generated which either grants or denies a persons in a roles the ability to communicate with the patient. For example, if the system administrator entered the name of a potential visiting party such as "Joe" and associated a role such as "guardian" with this party, then the hierarchy engine would search the database and find the established system definition of a guardian and assign the 'Joe' to the role of a guardian. Then 'Joe' would be granted permission to visit all parties that anyone in the guardian role as defined by the system would be allowed to visit. The system may also grant 'Joe' in a guardian role the ability to grant or deny access to visit the patient. Thus, 'Joe' in a guardian role may be able to prevent visitation by a 'distant friend' by classifying a party such as an 'old neighbor' to the role of 'distant friend' and denying access to the communication to all persons who have been assigned to the role of "distant friend." Similarly, the guardian or a doctor may assign a relative such as a 'Bob' to the role of 'close relative' and allow all close relatives to visit the patient. Furthermore, since the primary physician is higher in the hierarchy than the guardian, then the primary physician may be able to revoke the assignment of the 'Joe' to the role of guardian and prevent the once able to visit guardian from visiting the patient.

After these rules are generated by the rules engine 164, the rules are stored in the hierarchy rules 164 section, which stores these rules to memory and also applies the patient specific rules as parties are entered into the system. Thus when a party, such as the afore mentioned 'old neighbor' logs into the system and attempts to establish contact with the patient, the rules engine will check the 'old neighbor,' see that the 'old neighbor' has been assigned to the role of 'distant friend', and check the role of 'distant friend' in order to determine that all distant friends are denied access to the patient. As such the system will deny the 'old neighbor' permission to visit the patient. The 'old neighbor' will continue to be denied permission to visit the patient unless and until the 'old neighbor' is reclassified in the hierarchy into a role where parties are allowed to visit the patient or the role is changed, both of which requiring intervention by a party higher up in the hierarchy.

Figure 3:
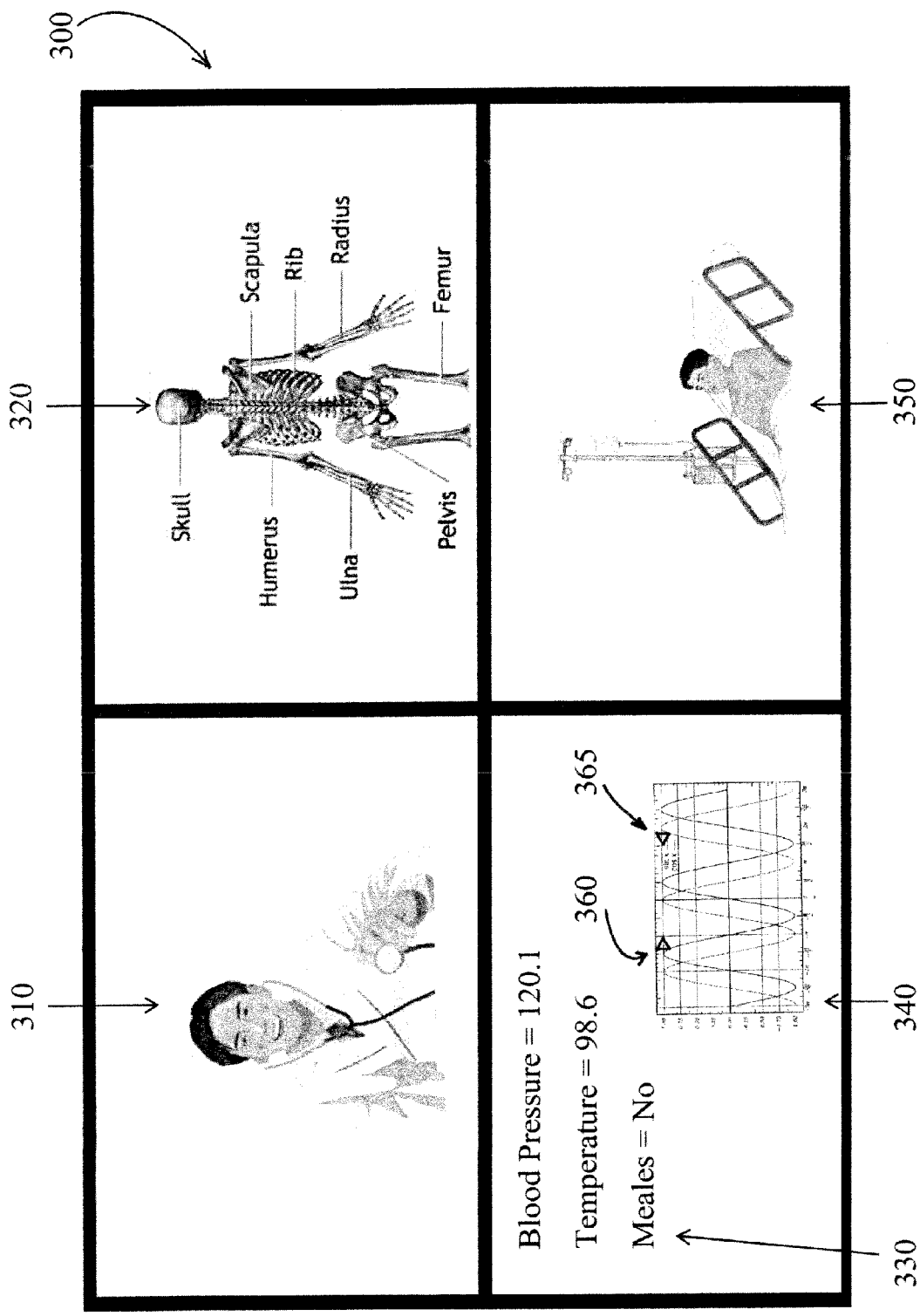
FIG. 3 illustrates one of many possible split screen video displays integrating different video components.

With respect to FIG. 3, a video terminal is used to present one-on-one communication with a patient. The entire screen may be filled with the image of the person with whom the patient wishes communication. Alternately, an associated video processor controls the video screen to act as a split screen into sections 300 through which multiple parties or parties and graphical data displays may be presented. The screen could be split in half horizontally, in half vertically, split into thirds vertically, into thirds horizontally, into quarters, etc. This allows the patient to be presented with medical information or engage in multi-party conversations through use of a television video monitor. The television screen or monitor facilitates this functionality by use of split screen display such that portions of two or more different images occupy different sections 300 of the screen. The various video signals that may be incorporated into the split screen video feed include, but are not limited to, the physicians 310, diagnostic images 320, medical readings and vital signs charts 330 or wave forms 340, and the patient 350, patient family members or friends. A pointer or cursor 360 is controllable by the speaker when explaining diagnostic images, charts, medical readings, or the like. Analogously, a second cursor 365 is controllable by the patient, e.g., when asking questions about a diagnostic image, chart, etc. Other multi-groups or arrangement of multiple items and elements are also similarly possible. As another option, the patient can display entertainment in one of the sections of the display while video communicating with a friend or relative on another section. The hierarchy system may be used to limit the video callers that can be displayed concurrently with entertainment. For example, a video call from the physician or other medical professional can block entertainment programming or pause it so the patient can pick up at the same point after the medical video visit.

Figure 4:
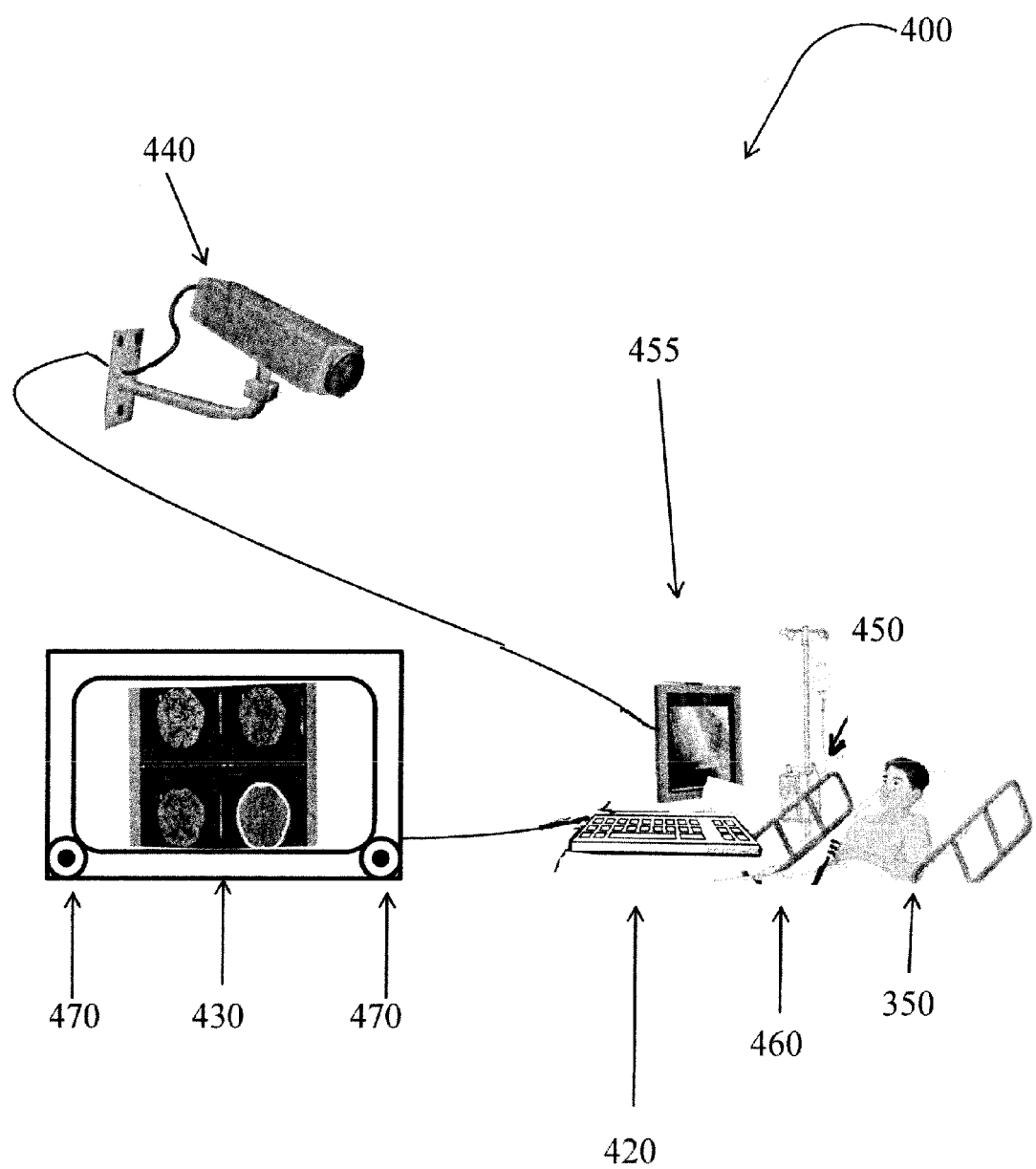
FIG. 4 illustrates one of the many possible architectures for the in room system.

With reference to FIG. 4, one embodiment of in-room audio and video architecture 400 enables the patient to interact with persons outside of the patient's hospital room is presented. A keyboard 350, TV remote or other control 420 and a television or computer monitor 430 and speakers 470 in a patient's hospital room units includes base features for multiple inputs such as the cable, wired, or wireless tuner and a number of auxiliary base-band video sources. The keyboard or control 420 provides the patient a means to control the system, while television monitor 430 also provides a serial interface with a command set to allow for external control of TV functions such as power on/off, TV station and other video source selection, and the like. The system architecture of a current STI AV unit also contains serial interface options that can be used to drive the serial port for the in-room TV. Some levels of the hierarchy, e.g., the physician roles 220, 230, have the ability to control, e.g., turn off the TV or computer monitor overriding the control 420. The audio and video system also includes a video camera 440 and microphone 460 or other audio visual pickup choices. The medical professional at terminal 190 or 195 can control direction, zoom, and other features of the camera or microphone. The present application adds command and control logic used to add intelligence to the use of an interactive system with hierarchy based switching options. The present system provides a robust feature set which allows for control scenarios that are unique in the hospital setting. In addition to the television or computer monitor 430, one or more physiological monitors 450 monitor the patient's vital signs, e.g., EKG, blood oxygen, pulse rate, and the like, and communicate them to a nursing station, hospital records database, or other remote location. One or more vital signs monitor display(s) 455 presents the patient's vital signs. The system may also contain signaling apparatus for sending a message or an alert through the system to a doctor, the electronic ICU station 195, or other medical professional in case of an emergency.

This architecture allows for a patient to be monitored by the members of a medical staff including a primary care physician, an on-call physician, or by an on-duty nurse who work in the same hospital as the patient currently resides. The medical staff may monitor the vital signs of the patient, along with the video picture of the patient. The monitoring may also be done by the system, and when reading change in a sudden or critical manner, the system may produce an alert. The medical staff may respond to the alert The patient may also prompt an alert call by using an alert button in the system, by calling for help through the microphone, or by gesture through the camera. Such an alert would be received by the medical staff monitoring the patient and all other patients from a centrally located monitoring location within the hospital or in a specific wing or section of the hospital. This architecture provides a more efficient use of doctor and nursing resources since access to a video display may enable a single doctor or nurse to monitor more patients. This efficiency improvement could be offered as a solution to alleviate a doctor or a nursing shortage in a specific hospital or specialty. The alert signal can automatically block a TV, internet or telephone signal, set-up 2-way audio visual communications with the electronic ICU (overridable by a physician with a higher position in the hierarchy).

The present system may also allow a doctor in a central location such as his office/home to make the traditional doctor 'rounds' in a virtual environment. The doctor may sit in a central control terminal and participate in a virtual session with the patient through audio and video means. The doctor may interact with multiple patients in this manner by switching between the different audio visual feeds from different patients. Making rounds in this audio video manner comprises "virtual rounds", where by the doctor visits with and asks questions, reads the charts, makes visual assessments, and the like, of each of the patients under the doctor's charge. The present system facilitates rounds because unlike a closed circuit monitor, the present embodiment allows for two-way communication such that the doctor may ask questions and hear responses by the patient. The present application also allows the doctor making virtual rounds to show the patient medical displays such as x-rays, and use a pointer or cursor controlled by a computer operable interface such as a mouse to explain the displays and answer questions posed by the patient. This would enable a doctor to incorporate more patients in making rounds, thereby increasing the frequency of contact with patients and also improving the quality of care.

The system also facilitates improved accuracy in record keeping and clinical documentation because the virtual round could be documented by recording the time and duration of the virtual visit by recording the activation time and length of operation of the system. The communications between the doctor and the patient could also be stored to record a diagnosis or to record that a warning was given. The patient's physical appearance and symptoms exhibited by the patient, such as but not limited to, skin coloration, coughing, breathing problems, sweating, rashes, shaking and the like could also be stored in order to facilitate record keeping. The progress of a disease or affliction could also be recorded in order to facilitate diagnosis or for medical research studies.

An expanded architecture may also incorporate a specialist who have not yet been involved with the patient health but reside within the same health care facility. Such a specialist may be brought into an existing call between the doctor and the patient, the specialist may call on the patient independent of another doctor, or the specialist may reply to a request made by the patient.

An expanded architecture can provide an audio-visual link the patient in a medical facility with medical professionals located in another medical facility via the firewall 125 and the network 120. This would enable patients located in small community hospitals, rural medical facilities, or other locations where access to specialists may be limited, to contact a specialist. Such an architecture could also permit access to clinics throughout the world if the patient were in need of a medical researcher, an academic hospital, or a world renowned expert in a particular medical field. Such functionality would also allow teams of medical doctors to consult and deliberate regarding the suggested treatment of a patient. Such an application would require that the outside party be equipped with the means to navigate the medical facility firewall so that the outside party would be able to communicate with a party inside of the firewall.

An expanded architecture also allows the patient residing in locations outside of a traditional hospital to receive electronic audio-visual medical supervision. Such locations include, but are not limited to, nursing homes, long term care facilities, home care, hospice, mental care facilities, assisted living facilities, and the like.

An expanded architecture can also allow audio-visual visitation of the patient by non-medical related parties who may be concerned with the health and welfare of the hospitalized patient. Such parties can include, but are not limited to, friends, relatives, lawyers, insurance providers, government officials, business associates, funeral planners, and the like. The system could also enable patients to have audio-visual communications with other persons who suffer from the same or a similar malady, such as members of a support group. The system could also be set up such that a specific type of call is routed to the optimal person who possesses the skill set best needed and most appropriate for treating a specific symptom.

As the architecture of the present system is expanded to encompass additional persons, the need increases for a command and control structure to prioritize the degree of access granted or denied to individuals within the system. This is achieved through setting up a hierarchy of permissions wherein titles or roles are established and defined so as to allow persons occupying roles at the top of the hierarchy to determine whether persons in roles lower in the hierarchy are to be granted or denied access to the patient within the system. Such a hierarchy is established individually for each patient when admitted to the medical facility, or as subsequently amended.

Figure 5:
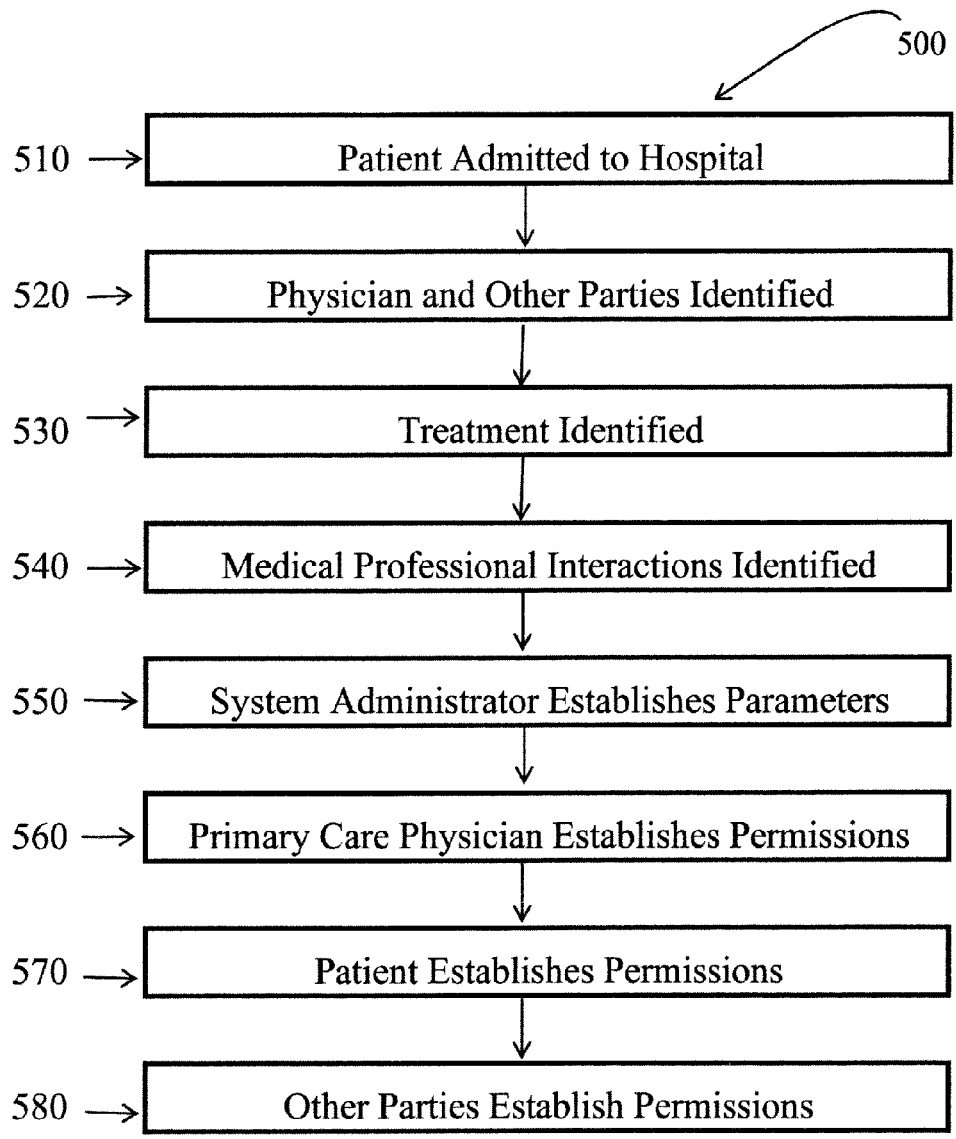
FIG. 5 illustrates a method of establishing permission hierarchies.

With reference to FIG. 5, a method 500 by which the system operates is set forth. The patient is admitted 510 to the hospital or medical facility and be entered into the system. At such a time, a primary care physician, family members, friends, attorney are identified 520. Then the type of treatment is intensified 530 and associated on duty physicians and nurses with whom the patient will interact are identified 540. The system administration establishes 550 a permission hierarchy such as but not limited to time of day, names of medical person that will determine when and from whom the patient may send and receive communications. The primary care physician or an admitting nurse inputs 560 these permissions, and the patient also assigns permissions 570 regarding from whom and when the patient wishes to receive communications. Then other parties also establish permissions 580.

Conflicts, such as the doctor prohibiting the same person that a patient has chosen to allow are resolved via rules established by the system administrator. Different patients will have differing permissions granting ability depending on health, strength, and coherence of the patient. In one instance the family may be able to over ride the patient's preferred permissions. In a separate instance, the patient's attorney or guardian may be able to over ride patient or family preferences. In a separate embodiment, the patient's best friend may be able to overrule the family and attorney. Permissions hierarchy may be changed due to changes in patient conditions or to account for a change in primary care physician.

Figure 6:
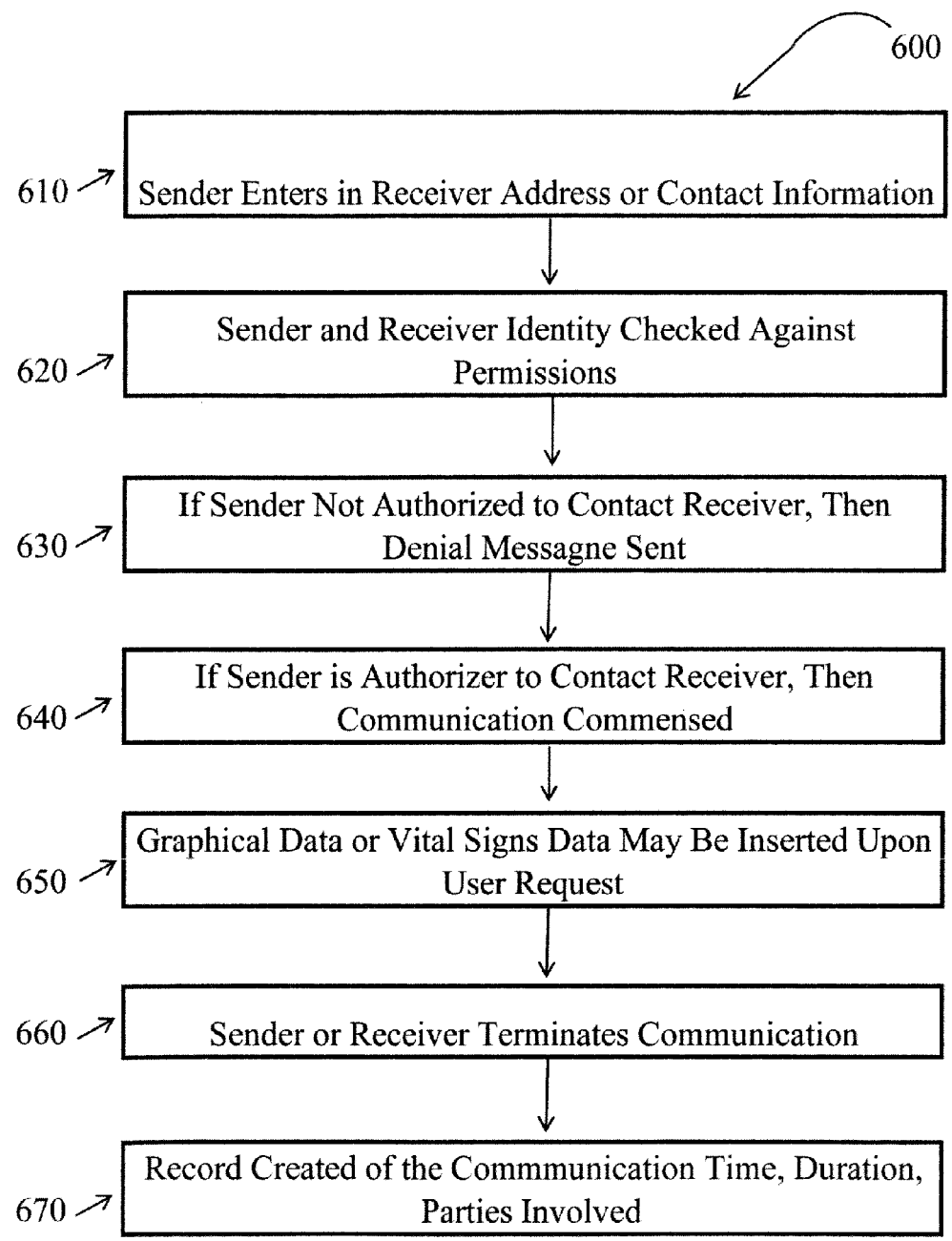
FIG. 6 illustrates a method of establishing a connection between a sender and a receiver.

With respect to FIG. 6, a method 600 of checking access permissions uses the hierarchy to facilitate communication between patient and party. In a first step 610, a caller, be they a patient calling someone, or someone calling the patient, enters the contact information, such as an email address or telephone number of the party they wish to contact. The address of the non-patient sending or receiving party is checked 620 against the hierarchy of the patient, doctor, administrator, or other's selected permissions. If the sender is not authorized to contact the party, then a message is generated 630 indicating that permission has been denied. Such a message may indicate whose permission or what other aspect of the permissions hierarch was violated, or in the alternative, the message may leave the reason the contact was denied anonymous. If the sender is authorized 640 to contact the receiving party, then an indicator on the receiver's terminal, such as but not limited to a telephone ring, a flashing light, or a message prompt on the receiver's screen is initiated so as to indicate that the receiver is receiving a message. The identity of the receiver may be known or anonymous. The receiver may either choose to accept the messaging request, actively deny the request, or ignore the request until it goes away. Accepting the request begins the communication process, denying the request may or may not send a message, and ignoring the request will produce an attempting signal until the sender gives up or the receiver takes action to answer or deny the message request. Higher levels of the hierarchy, particularly those of medical professionals may interrupt other communications, override a denial of access by the patient, or the like. When the message begins, the other persons in the hierarchy may be made aware of the parties involved in the contact. Parties may also request 650 that other persons or other graphical aids, such as but not limited to diagnostic images, diagnoses, scans, and vital signs, be brought into the conversation. The contact is terminated 660 by an act of either the sender or receiver. A record of the calls, e.g., time duration, parties, is created 670.

In addition to granting or denying access by specific persons to the system, access may also be automated based on time of day access controls to regulate when video visit calls can be accepted based on the hospital's visiting hours policy. Time of day control would be differentiated by type of access (e.g. video visit versus ICU access). Access could also be based access on condition of the patient, malady the patient suffers from, or religious holidays.

Since the system permits monitoring by the doctor, the system maintains a specific degree of privacy as per the HIPAA laws and regulations. Such personal and private information may also be protected through use of encryption software that may prevent parties without authorized access from accessing or inputting system information. Such encryption software may include SSL or IPSEC with strong user authentication in order to facilitate remote access by physicians working remotely from a remote computer terminal or from a mobile laptop system. Such security may be performed automatically and also may include disable split tunneling to the Internet, automated security configuration, remote video assessment features, multiple access for an automated hierarchy to control one 2-way session or multiple one way sessions for a specialist physician or a physician team. This might include automatic security configuration checking on terminating device at customer DMZ, and accessing an in-room A/V server with PTZ and other navigation features. This might also include means for remote control of the movement, focus and zoom features of the camera by the doctors. The system may also incorporate digital rights management to prevent the unauthorized playback of remote physician sites. Finally, the system may incorporate means by which the patient can record a visit or record a television program that they would otherwise miss due to a present visit using means such as TIVO™, a video recorder, and the like.

Figure 7:
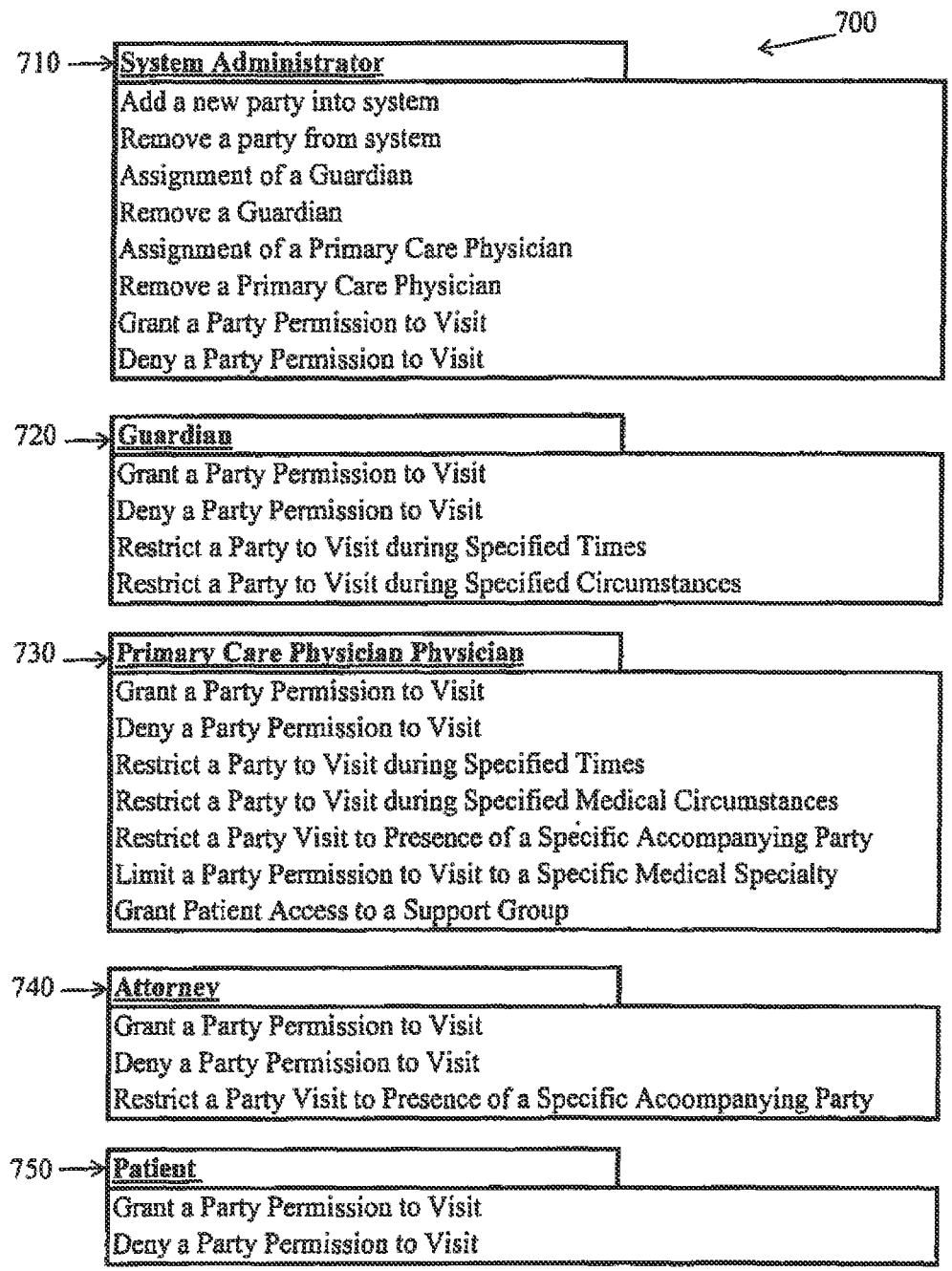
FIG. 7 illustrates a sample listing of hierarchy roles and the permissions each role may grant or deny.

With reference to FIG. 7, a list of some, but not all, of the roles within the hierarchy along with the permissions that may be granted or revoked are displayed 700. In these instances, the party may refer to a potential visitor to the patient, a medical professional, or the party may be the patient themselves such that restrictions may be placed on the patient as to whom the patient may contact.

At the top of the hierarchy 700, the System Administrator 710 has the most all inclusive power to grant the greatest number of permissions. The administrator can add a new party into the system, can remove an existing party from the system, can assign a guardian to or remove a guardian from a patient, can assign a primary care physician to or remove a primary physician from a patient, and can grant or deny a party permission to visit a patient. In a typical embodiment, the system administrator could have any or even all of the powers held by any role within the hierarchy.

The guardian 720 can also grant or deny a party permission to visit a patient, can restrict a party to visit during specific tomes, or can restrict visitation to a specific set of circumstances.

The primary care physician 730 can grant or deny a party permission to visit a patient, and may restrict visits to specific times or according to specific medical circumstances. The physician may limit a party visitation may require accompaniment by another party, or may grant other physicians with expertise in other medical specialties permission to visit. The physician may also grant patient permission to participate in support groups with other patients suffering from the same malady or affliction.

The attorney 740 can grant or deny a party permission to visit a patient, or can require that another party be present, such as the attorney, when a specific party visits the patient. This permission may be necessary due to the possibility of a patient in a sub-optimal mental or physical state being taken advantage of during a time of great stress within the patient's life and the desire to protect the patient from such persons under such circumstances.

The patient 750 can also grant or deny a party permission to visit a patient. This may be done at the patient's discretion. The patient's abilities to set a visitation policy will be limited by the visitation policy of the medical facility, by prognosis of the physicians, and by what the guardian believes to be in the best interest of the patient. The patient's ability to grant or deny permissions will be limited based on the patient's physical and mental condition, with sicker patients being permitted the least latitude, and the healthiest patients being granted the most latitude. The hierarchy may be customized for each individual patient entering the medical facility. Different patients may have varying degrees of consciousness or cognition and thus may have different individual abilities to grant or deny visitation permission to persons occupying roles within the hierarchy. Some patients may have the ability to make judgments themselves, while others may need the attorney present to decide the same matter. Patients may also vary individually regarding their desires to interact with friends, relatives and associates such that the present system will accommodate these different criteria.

This permission concept may also be applied to the use of various functionalities within the system. Certain roles may be denied access to graphical features such as x-rays or MRI scans, while others may be limited to only view the patient while the monitor is in a split screen mode. Some persons in roles may be limited to appearing on a split screen with a specific graphical display on the other half of the screen such as someone with the specialist role.

Figure 8:
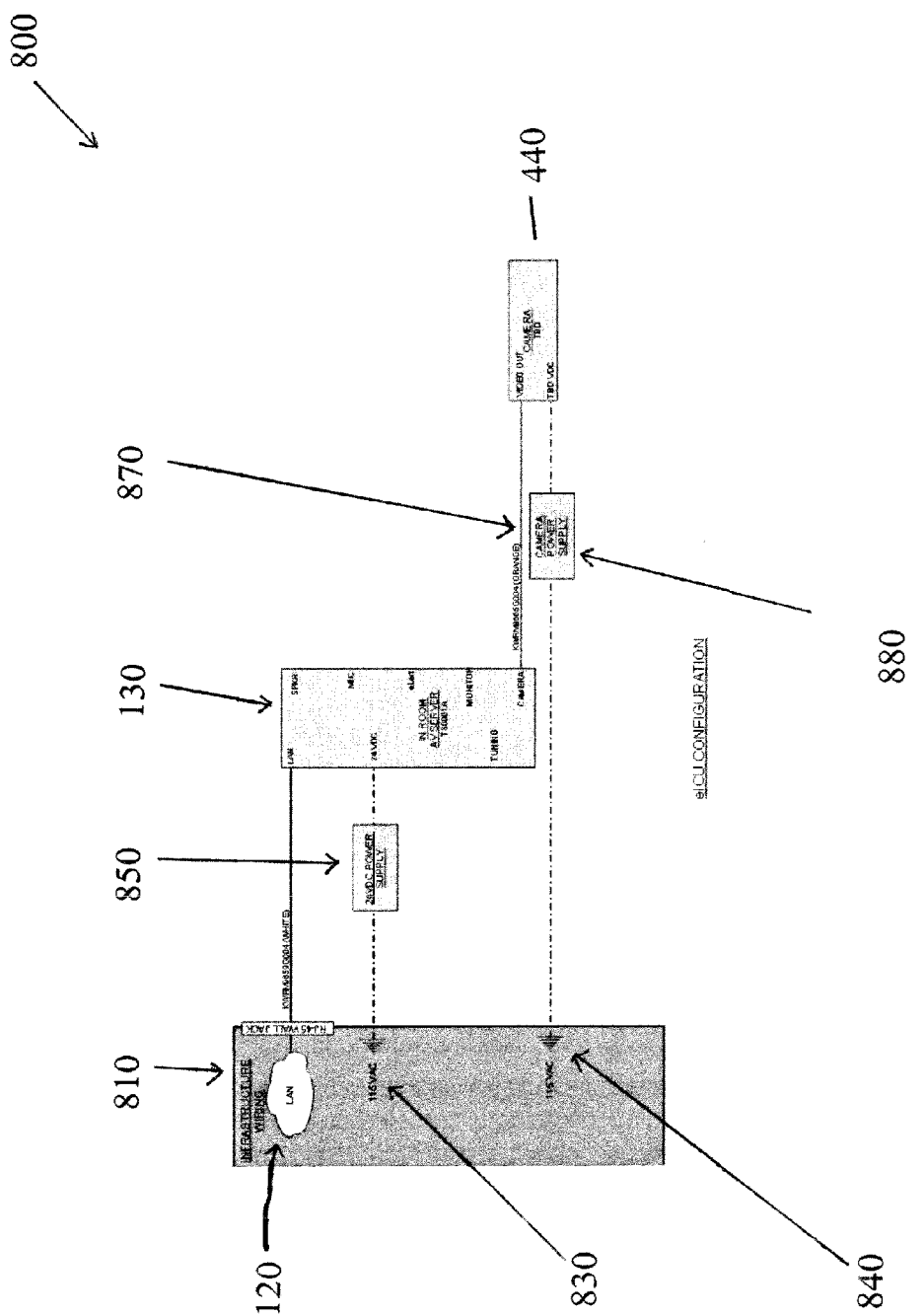
FIG. 8 illustrates a possible eICU configuration.

With reference to FIG. 8, the electronic intensive care unit (eICU) configuration 800 has infrastructure wiring 810 including, but not limited to, the local area network (LAN) 120, and a plurality of power supplies 830, 840. The first power supply 830 powers a lower voltage, e.g., a 24 V DC power supply 850 which powers the audio video (AV) server 130 in the patient's room. The other power supply 840 connects to a camera power supply 880 of a camera 440. The camera signal 870 is fed to the AV server 860.

Figure 9:
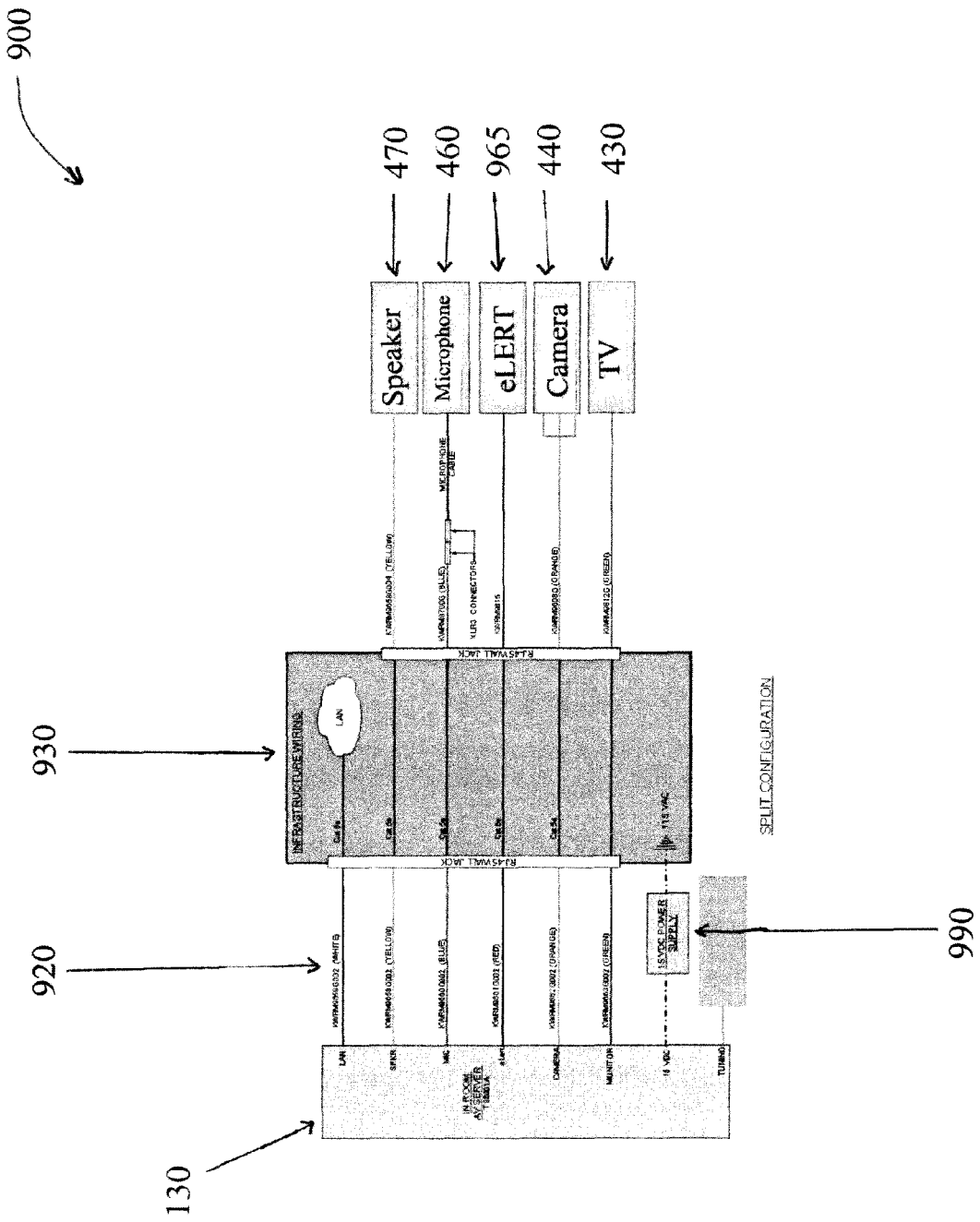
FIG. 9 illustrates a possible split configuration.

With reverence to FIG. 9, a split system configuration 900 includes an in-room audio video server 130' connected through a series of colored coded wires 920 to the infrastructure wiring 930 which includes a LAN system and is powered by power supply 990 that is connected to the in room server 130'. The infrastructure wiring 930 is, in turn, connected to a plurality of audio and video components, including but not limited to the audio speaker 470, a microphone 460, an alert button 965, the camera 440, and the television monitor 430.

Figure 10:
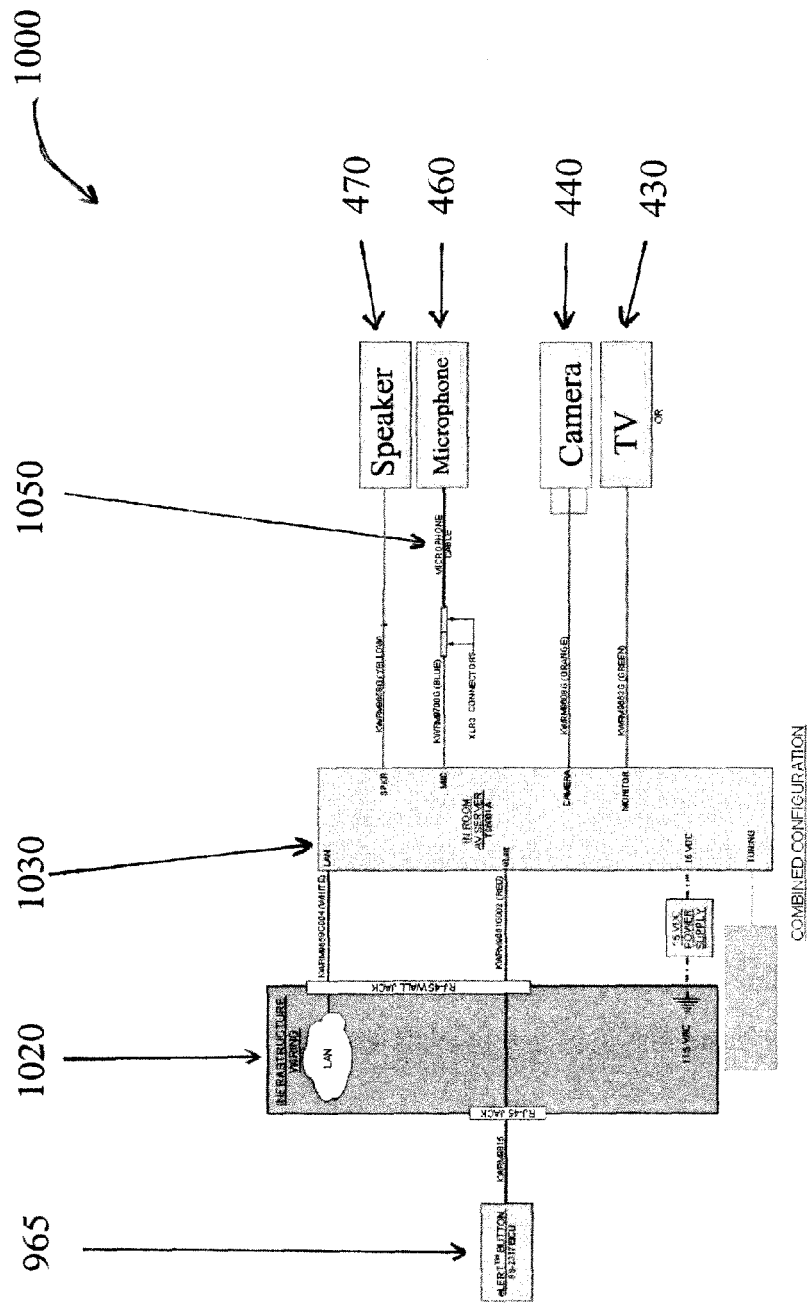
FIG. 10 illustrates a possible combined configuration.

With reverence to FIG. 10, a combined configuration of the system 1000 features an electronic alert (eLERT) button 965 which is connected to infrastructure wiring 1020 including, but not limited to a LAN. A series of jacks or other connectors connects this infrastructure wiring to an in-room audio video server 1030, which in turn is connected by means of a series of wires to the audio speaker 470, to the camera 440, and to the television display screen monitor 430. A microphone cable 1050 connects the microphone 460 to the system using a connector.

Figure 11:
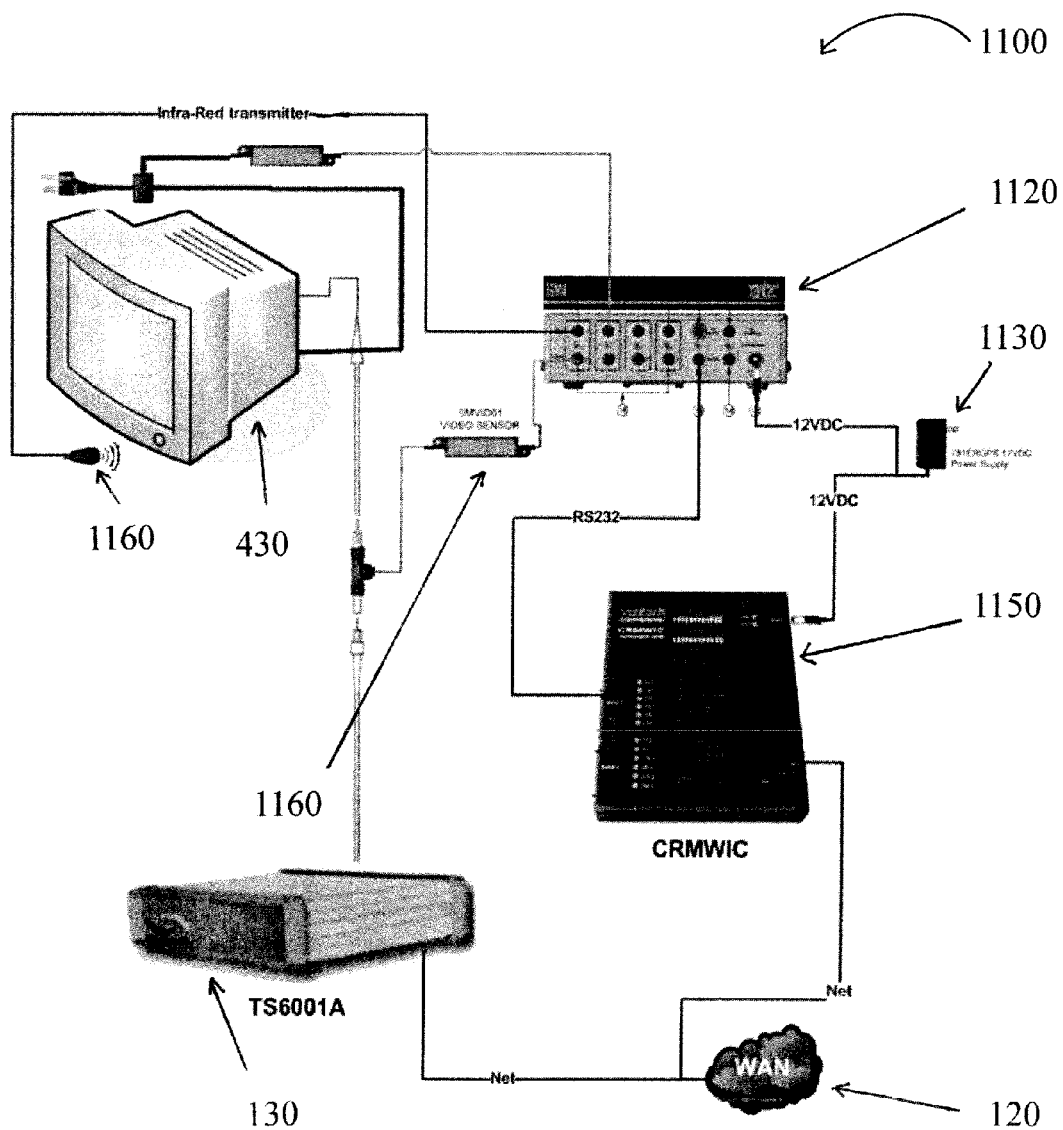
FIG. 11 illustrates a possible equipment layout implementation.

With reverence to FIG. 11, the hardware connectivity 1100 features an infrared transmitter 1160, and a television display monitor 430, both of which are directed to feed and receive signals from a switcher 1120 powered by a 12 volt DC system 1130. Both the 12 volt Dc 1130 and the switcher 1120 are wired into a control system 1150 which is connected to the network 120 such as, but not limited to a WAN. This network is connected to a server 130, in which the server 1180 is also connected to the monitor 430 and through a video sensor 1160 to the switcher 1120.

Figure 12:
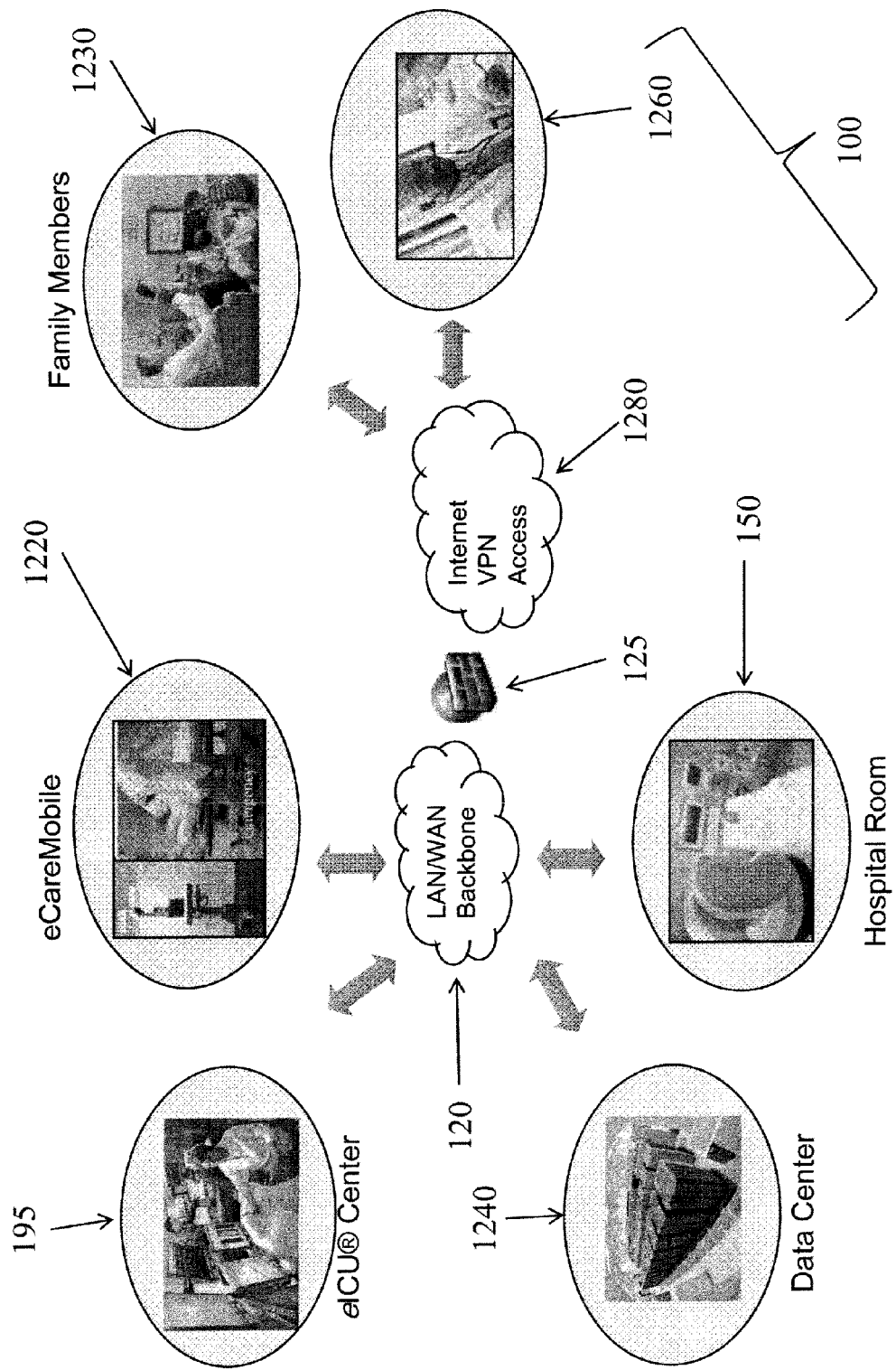
FIG. 12 illustrates a set of possible parties and access routes.

With reverence to FIG. 12, audio video access to the system 100 is graphically illustrated. This embodiment includes a data center 1240 which stores the data which can be accessed through the LAN/WAN backbone 120. LAN/WAN access is provided to an eICU Center 195, an eCareMobile module 1220, and to a patient's hospital room 150. The system may also be accessed through a secure protective firewall 125 via internet access 1280 by the physician at a home office 1260 or by remotely located family members 1230.

The present solution may be bundled in as part of a network or an internet based electronic patient monitoring, communication and care management system in order to provide additional functional capabilities and increase the value of this product. The system may provide additional capabilities and increase the value of an internet based health care system. Patients in non-ICU beds are more stable and alert than ICU patients, so are more likely to be interactive with their managing physician(s), specialists, and family members.

The method, system and apparatus described herein may also incorporate a computer operable means including but not limited to a computer data input means, a computer display terminal for presenting data, a computer memory that may contain a database, and a network connection that may enable the method, system and apparatus to interact on a computer network system including but not limited to the Internet. The present system and apparatus preferably includes encryption to control access to and maintain confidentiality of the data generated by and conveyed through the present system and apparatus. The system may also incorporate various types of microphones and audio speakers in order to facilitate the recording and transmission of audio signals. The system and apparatus may also contain cables, wires, and wireless transmission components necessary to facilitate the connection of the audio, video and computer operable apparatuses.

The present application has been described with reference to the preferred embodiments. Modifications and alterations may occur to others upon reading and understanding the preceding detailed description. It is intended that the present application be construed as including all such modifications and alterations insofar as they come within the scope of the appended claims or the equivalents thereof.

The invention claimed is:

1. An interactive communications system comprising:
a plurality of in-room video communications systems, each in-room video communication system including a video monitor, a video camera, a microphone, and an audio speaker associated with a patient;
a video selection unit which supplies video entertainment and video communications to each of the in-room systems; and
a hierarchal access control unit which automatically arbitrates among the video entertainment and video communications based on a defined access hierarchy;
wherein the defined access hierarchy is adjusted based on vital signs of a patient measured by a physiological monitor.

2. The interactive communication system according to claim 1 wherein the hierarchal access control unit includes:
a data entry terminal through which the access hierarchy is entered or modified;
a database which stores the entered access hierarchy;
a server which selects among competing video communications and entertainment based on the entered access hierarchy; and
wherein the video selection unit connects the video communication or entertainment with each in-room video communication system.

3. The interactive communication system according to claim 2, wherein the access hierarchy contains at least one of a primary care physician role, an on-duty physician role, a specialist physician role, a nurse role, a patient role, a guardian role, an attorney role, a friend role, a relative role, and business associate role.

4. The interactive communication system according to claim 1, wherein the video selection unit is connected with a television or cable source, video telephone feed, and a hospital network.

5. The interactive communication system according to claim 1, wherein each in-room video communications system includes a patient control unit such as a keyboard or remote.

6. The interactive communication system according to claim 1, further including:
a hospital database which stores archived images and patient data.

7. The interactive communication system according to claim 6, further including:
a plurality of terminals for medical professionals connected to the video selection unit,
the video selection unit being controllable to establish a video conference call between one of the medical professionals terminals and a selected one of the in-room video communications systems.

8. The interactive communication system according to claim 7, further including a video processor which enables the medical professional terminal to send a split screen image with the medical professional in one section, an image, and a pointer controlled via the medical professional terminal.

9. The interactive communication system according to claim 1, wherein the access hierarchy is dynamically adjustable.

10. The interactive communication system according to claim 9, wherein the access hierarchy is temporally adjustable in accordance with a clock.

11. The interactive communication system according to claim 9, wherein the access hierarchy is patient condition adjustable in accordance with vital signs measured by a physiological monitor.

12. An interactive communication method for providing an in-room audio and video communications, the method comprising:
entering data related to a patient admitted to hospital;
establishing an access hierarchy including at least one of a system administrator role, a primary care physician role, and a patient role;
consulting the access hierarchy via a hierarchical access control unit to automatically arbitrate among persons requesting video communications access to the patient and video entertainment;
establishing a video communications link from a requesting person to an in-room video communications system including a camera, a microphone, a television monitor, a patient operated control, and an audio speaker;
wherein the access hierarchy is adjusted based on vital signs of a patient measured by a physiological monitor.

13. The interactive communication method according to claim 12, further including:
sending a request by a sender to contact a receiver using a computer operable input device;

checking addresses of the sender and the patient against the access hierarchy in the hierarchical access control unit;

if the sender is not authorized to contact the patient, sending denial message to the sender;

if the sender is authorized to contact the patient and if no sender with a higher role in the access hierarchy is competing to reach the patient, establishing a video communication channel between the sender and the patient.

14. The interactive communication method according to claim 12, further including:

with a patient control device, changing the access hierarchy and selecting among video entertainment and video communications.

15. The interactive communication method according to claim 12, further including:

from a medical professional terminal, establishing a video communication link including overriding access requests by persons with a lower role in the access hierarchy.

16. The interactive communication method according to claim 15, further including:

from the medical professional terminal, retrieving images or physiological data from a hospital database;

creating a split screen format in which a video image appears in one section and a video display based on the retrieved images and physiological data appears in another section.

17. The interactive communication method according to claim 16, further including:

moving a pointer on at least the video display controlled by the medical professional terminal or the patient control.

18. The interactive communication method according to claim 12, wherein the access hierarchy includes a plurality of roles in a hierarchy including a system administrator role, the primary care physician role, an on duty physician role, a specialist physician role, a nurse role, a patient role, at least one of a friends role a relative role, and a business associates role.

19. An interactive communication method for providing an in-room audio and video communications, the method comprising:

entering data related to a patient admitted to hospital;

establishing a permissions hierarchy including at least one of a system administrator role, a primary care physician role, and a patient role;

consulting the permissions hierarchy via a hierarchical access control unit to automatically arbitrate among persons requesting video communications access to the patient and video entertainment;

establishing a video communications link from a requesting person to an in-room video communications system including a camera, a microphone, a television monitor, a patient operated control, and an audio speaker adjusting the permissions hierarchy in accordance with vital signs measured by a physiological monitor.

* * * * *